United States Patent Office 3,360,491
Patented Dec. 26, 1967

3,360,491
METHOD OF POLYMERIZING SILOXANES AND SILCARBANES IN EMULSION
Gordon L. Axon, Midland, Mich., assignor to Dow Corning Corporation, Midland, Mich., a corporation of Michigan
No Drawing. Filed May 18, 1964, Ser. No. 368,352
37 Claims. (Cl. 260—29.2)

ABSTRACT OF THE DISCLOSURE

A method for polymerizing siloxanes and silcarbanes in emulsion employing organic sulfates of the general formula $R'OSO_2OH$, wherein $R'$ is a monovalent aliphatic hydrocarbon radical of at least 6 carbon atoms, is disclosed.

---

This invention relates to emulsion polymerization of organosiloxanes and silcarbanes. More specifically, this invention relates to a new method of polymerizing organosiloxanes and silcarbanes in emulsion.

The preparation of emulsions of high molecular weight organopolysiloxanes can be accomplished by first dissolving the polysiloxane in an organic solvent and then emulsifying the solution. This method has the disadvantage inherent in the use of solvents and further the emulsions are not particularly stable.

A method of preparing organopolysiloxane in emulsion is disclosed in U.S. Patent 2,891,920, wherein the polymerizing agents are strong bases or strong mineral acids. While this method produces excellent polysiloxane emulsions, the strong mineral acids present a problem in neutralization and/or removal. Further, for best results a separate emulsifying agent is employed in the said method.

It is an object of the present invention to provide a new method for polymerizing organosiloxanes and silcarbanes in emulsion. A further object is to provide a method of preparing stable organopolysiloxane latex emulsions. These and other objects will become apparent from the following description.

This invention relates to a method which comprises polymerizing and copolymerizing (1) at least one member selected from the group consisting of organosiloxanes of the unit formula $$R_nSiO_{\frac{4-n}{2}}$$

in which R is selected from the group consisting of hydrogen atoms, monovalent hydrocarbon radicals and monovalent halohydrocarbon radicals and $n$ has an average value of from 1 to less than 3 and silcarbanes having the general formula $HO(R)_2SiQSi(R)_2OH$ wherein R is selected from the group consisting of hydrogen atoms, monovalent hydrocarbon radicals and monovalent halohydrocarbon radicals and Q is a divalent radical attached to both silicon atoms via a silicon-carbon bond, said Q being selected from the group consisting of radicals composed of carbon and hydrogen atoms and radicals composed of carbon, hydrogen and oxygen atoms, there being less than 15 carbon atoms in said Q radical and any oxygen that is present being in the form of ether linkages, by polymerizing said member in an aqueous medium while in a dispersed state in the presence of (2) a compound of the formula $R'OSO_2OH$, wherein $R'$ is a monovalent aliphatic hydrocarbon radical of at least 6 carbon atoms, until the desired increase in molecular aggregation is obtained.

In carrying out the method of this invention the siloxane and the alkyl hydrogen sulfate $R'OSO_2OH$ are dispersed in water to form a stable emulsion. The emulsion is then allowed to stand with or without agitation at the desired temperature until the siloxane has reached the desired state of molecular aggregation. Alternatively, the sulfate can be added to the water first and the siloxane thereafter emulsified, or the siloxane can be emulsified and the sulfate then added and the polymerization allowed to proceed as above. In this latter method, emulsification of the siloxane can be aided, if desired, by the use of a nonionic or anionic emulsifying agent. This is of course not necessary, and any desired means can be employed to bring the siloxane into aqueous emulsion, such as violent mechanical agitation, ultrasonic vibration or any other suitable manner. In addition, the sulfate catalysts of this invention are themselves excellent emulsifying agents for this system.

It should be understood that it is not essential to have or form a pre-emulsion of the siloxane or silcarbane to be polymerized. The polymerization and emulsification processes can be taking place essentially simultaneously. By way of illustration, the siloxane or silcarbane can be added to an aqueous solution of the catalyst with agitation, the siloxane or silcarbane being emulsified as it is polymerized. It is obvious, of course, that when employing this technique it is desirable that the siloxane or silcarbane being polymerized have a high surface area in order to get reasonable reaction rates. Thus, when polymerizing solid silcarbanes it is preferable to employ them in finely divided form.

It should also be understood that the siloxane can be generated in situ in the emulsion by adding hydrolyzable silanes such as alkoxy silanes to the water and emulsifying the mixture. Under these conditions, the silanes will hydrolyze to siloxanes which will proceed to polymerize in accordance with this invention. However, when this method is used, care should be taken that the amount of alcohol generated is not sufficient to break the emulsion. Thus, in general, the amount of alkoxy silane employed should not be greater than about 10% by weight based on the total weight of the emulsion. When it is desirable to employ more than 10% by weight of an alkoxy, say up to 30 or 40%, it is generally preferable to slowly add the alkoxy silane, with agitation, to a heated mixture of the sulfate catalyst and water.

This invention also relates to a method for preparing hexaphenylcyclotrisiloxane which comprises polymerizing diphenylsilanediol in the presence of a catalyst of the formula $R'OSO_2OH$ wherein $R'$ is a monovalent aliphatic hydrocarbon radical of at least 6 carbon atoms.

This invention also relates to a method which comprises polymerizing and copolymerizing (1) at least one member selected from the group consisting of organosiloxanes of the unit formula $$R_nSiO_{\frac{4-n}{2}}$$

in which R is selected from the group consisting of hydrogen atoms, monovalent hydrocarbon radicals and monovalent halohydrocarbon radicals, and $n$ has an average value of from 1 to less than 3 and silcarbanes having the general formula

wherein R is selected from the group consisting of hydrogen atoms, monovalent hydrocarbon radicals and monovalent halohydrocarbon radicals, by polymerizing said member, in an aqueous medium while in a dispersed state, in the presence of (2) a compound of the formula R'OSO₂OH, wherein R' is a monovalent aliphatic hydrocarbon radical of at least 6 carbon atoms, until the desired increase in molecular aggregation is obtained.

This invention still further relates to a method which comprises polymerizing and copolymerizing silcarbanes having the general formula

wherein R is a member selected from the group consisting of hydrogen atoms, monovalent hydrocarbon radicals and monovalent halohydrocarbon radicals, in an aqueous medium, by polymerizing said silcarbanes while in a dispersed state in the presence of a catalyst compound of the formula R'OSO₂OH, wherein R' is a monovalent aliphatic hydrocarbon radical of at least 6 carbon atoms, until the desired increase in molecular aggregation is obtained.

In the silcarbanes the divalent Q radical can be, for example, p-phenylene, m-phenylene, p-xenylene, p-xylylene, p-diphenylene ether, p-dimethylenediphenyl ether, methylene, ethylene, propylene, butylene, pentamethylene, dipropylene ether and butylidene radicals.

Polymerization of the siloxanes proceeds best at room temperature but may be carried out at any desired temperature. Preferably, of course, this should be below the boiling point of water although, if desired, temperatures above 100° C. can be employed if the polymerization is carried out in a closed system. The preferred temperature range is from 25 to 90° C.

The time of polymerization is not critical but will vary depending upon the speed of the reaction and the viscosity desired in the resulting siloxane. It has been found that as the polymerization proceeds the viscosity of the siloxane will increase and the average size of the emulsion droplets decreases. A combination of these two processes is believed to result in the extremely stable emulsions obtained by the method of this invention.

The concentration of the siloxane with respect to the water is not critical. All that is required is that the dispersion be a siloxane in water. Thus, so long as there is enough water to give a continuous aqueous phase the polymerization will proceed in accordance with this invention. Polymerizations can be carried out at siloxane concentrations of one percent by weight or less.

When polymerization is complete the siloxane may be recovered from the emulsion by breaking it in any desired fashion, such as by the addition of salts such as sodium chloride or by evaporation of the water or by the addition of water-soluble alcohols such as methanol, ethanol or isopropanol. When the emulsion is broken by the addition of salts or alcohols, the polymer is obtained relatively catalyst free.

Preferably, the emulsion should be neutralized with an alkaline material such as ammonium hydroxide, sodium hydroxide, potassium carbonate, lithium bicarbonate, etc., by adding an amount sufficient to render the emulsion to a pH near 7. This should be done where stable emulsions are desired. This neutralization is not necessary, however, particularly if the polysiloxane is to be recovered by removal from the emulsion per the above.

Any silcarbane having the general formula

HO(R)₂Si—Q—Si(R)₂OH or any organosiloxane of the unit formula

in which formulae R is of the group monovalent hydrocarbon radicals, halogenated monovalent hydrocarbon radicals or hydrogen atoms and in which $n$ has an average value from 1 to less than 3 can be employed in the method of this invention. Preferably, $n$ has a value of about 2 or from 1.9 to 2.1. Thus, it can be seen that the siloxanes employable herein range from resinous materials having an average of one R group per silicon up to fluid endblocked polymers having an average of greater than two R groups per silicon. The viscosity of the starting siloxane is not critical. If the viscosity is too high for adequate dispersion of the siloxane, a small amount of solvent may be employed which may subsequently be removed, if desired, before polymerization is begun. As pointed out above, the silcarbanes employed herein can be solids. It should be understood that the method of this invention applies equally well to the preparation of homopolymeric siloxanes and to the preparation of copolymeric siloxanes. Thus, for example, one might polymerize an organosiloxane of the formula R₂SiO such as dimethylsiloxane or one may copolymerize mixtures of siloxanes of the formulae RSiO₁.₅, R₂SiO and R₃SiO.₅, or one might polymerize a silcarbane of the formula HO(R)₂Si—Q—Si(R)₂OH, or one might copolymerize mixtures of silcarbanes having this formula, or one might copolymerize mixtures of these siloxanes and silcarbanes.

The term "unit formula" means that the siloxane is essentially of the formula shown but that they can also contain some silicon-bonded OH groups or some silicon-bonded hydrolyzable groups such as alkoxy, acyloxy or oxime groups, etc.

For the purpose of this invention R in the above formulae can be any monovalent hydrocarbon radical such as alkyl radicals such as methyl, ethyl, propyl, octadecyl and myricyl; alkenyl radicals such as vinyl, allyl, methallyl, hexenyl and butadienyl; cycloaliphatic radicals such as cyclobutyl, cyclohexyl, cyclopentenyl, and cyclohexadienyl; aryl hydrocarbon radicals such as phenyl, tolyl, naphthyl, mesityl, thymyl and xenyl; and aralkyl hydrocarbon radicals such as benzyl, benzhydryl, α-mesityl and β-phenylpropyl; halogenated monovalent hydrocarbon radicals such as chlorophenyl, α,α,α-trifluorotolyl, trifluorovinyl, trifluorochlorocyclobutyl, 3,3,3-trifluoropropyl and tetrabromoxenyl. The R groups can also be hydrogen although preferably there should not be more than one hydrogen atom per silicon.

The polymerization catalyst is compound (2) above, which is an alkyl hydrogen sulfate, wherein the substituent R' is a monovalent aliphatic hydrocarbon radical of at least 6 carbon atoms. Thus, suitable aliphatic substituents R' include hexyl, octyl, decyl, dodecyl, cetyl, stearyl, myricyl, oleyl and octynyl. Preferably, the R' radical has at least 8 carbon atoms, and most preferably contains from 10 to 18 carbon atoms, the R' radical can be straight or branched chain.

The catalysts of this invention are well known compounds and can be made according to known techniques such as by the reaction of an alcohol with sulfuric or chlorosulfuric acid. Preferably, the catalysts employed are made from primary alcohols. Catalyst (2) can be a single compound or a mixture of two or more compounds, each member of the mixture falling within the above recited definition.

The concentration of catalyst can vary from as little as 0.01 part by weight per 100 parts of silcarbane or siloxane and upward, if desired. Generally, it is preferred, for a reasonable reaction rate, to employ at least 0.5 part by weight. Any amount can be employed, although it is obviously wasteful to employ a large quantity of catalyst when a small amount will suffice. The use of large amounts of catalyst (2) can lead to difficulty in its removal when this is desired. Excellent results are obtained when the concentration of (2) is from about 0.5 to about 5 parts per 100 of silcarbane or siloxane.

As stated earlier, no emulsifying agent is needed to give stable emulsions with catalyst (2) as it serves this function as well. However, a nonionic or anionic emulsifying agent can be employed if so desired. Such nonionic emulsifying agents as saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol, and imine derivatives such as polymerized ethylene imine, and anionic emulsifying agents as alkali metal sulforicinates, sulfonated glyceryl esters of fatty acids, salts of sulfonated monovalent alcohol esters, amides of amino sulfonic acid such as the sodium salt of oleyl methyl tauride, sulfonated aromatic hydrocarbon alkali salts such as sodium α-naphthalene monosulfonate, condensation products of naphthalene sulfonic acids with formaldehyde, and sulfates such as ammonium lauryl sulfate, triethylanol amine lauryl sulfate and sodium lauryl ether sulfate can be employed, if desired.

The emulsions of this invention may be employed for release agents or for coating compositions. The method of this invention is particularly adaptable for the preparation of latex paints. For example, the emulsion can be mixed with the desired pigment or other fillers and then applied to a surface where the water will evaporate leaving a continuous coating.

It should be understood that the utility of the method of this invention is not limited to the production of emulsions but may also be employed to facilitate production of siloxane polymers which can be recovered by breaking the emulsion.

In a particular embodiment of this invention an emulsion polymer is prepared by the method of this invention from a siloxane essentially of the average formula

wherein R has the meaning already given, R" is a lower alkyl radical, i.e. methyl through hexyl inclusive, $m$ and $p$ are each integers of from 0 to 3 inclusive, the sum of $m$ and $p$ being not greater than 5, and $x$ has an average value of at least 7. This composition emulsifies readily and polymerizes to a polysiloxane which does not appear to be gelled, but which when removed from the emulsion, does gel to a crosslinked rubber. Fillers can be added to the polymerized composition while it is yet an emulsion so that the strength of the rubber resulting from coagulation of the emulsion is further improved. These fillers are best added as aqueous dispersions, such as colloids or emulsions. Preferably the filler is a silica filler, although any dispersible filler can be used, provided its addition does not cause breaking of the polysiloxane emulsion.

The emulsion, either with or without the added filler(s), is quite stable, and can be diluted, if desired, with more water. For maximum stability of the emulsion it is desirable to neutralize the catalyst in the emulsion with a base (i.e. $NaOH$, $NH_4OH$, $K_2CO_3$, $LiHCO_3$, etc.) to a pH near 7. This can be done either prior to or after the addition of filler, although in some cases it is desirable to neutralize the catalyst before the filler is added. This particular system provides an excellent method of obtaining, for example, coatings of tough rubbery siloxane films for such as release coatings.

It should be understood that fillers can be included in any of the emulsions of this invention. Also, finely divided abrasives such as diatomaceous earth can be incorporated in those emulsions to be employed as polishes.

The following examples are illustrative only and should not be construed as limiting the invention. The viscosity of the siloxanes shown in the following examples refers to the viscosity of the siloxanes per se, and not to that of the emulsions. Most of the viscosities of the siloxanes were determined by separating the siloxane from the emulsion and determining its viscosity by the usual methods. All viscosities are measured at 25° C.

*Exmple 1*

Three aqueous emulsions were prepared with a Fisher hand-operated laboratory homogenizer. The emulsions contained 30 g. of dimethylsiloxane cyclic tetramer, 59 milliliters of water and 6 g. of a 25% aqueous solution of various alkyl hydrogen sulfate catalysts (i.e., 1.5 g. of catalyst). The catalysts employed were (1) lauryl hydrogen sulfate, (2) cetyl hydrogen sulfate and (3) tridecyl hydrogen sulfate.

Part of each emulsion was retained at room temperature and part placed in a 70° C. oven. The emulsions were found to be more stable at room temperature. Of the three emulsions, the one containing tridecyl hydrogen sulfate looked best.

After about 5 days, the emulsions were neutralized with 10% sodium carbonate and then broken with acetone. Low viscosity fluids having viscosities of about 1000 cs. or higher were obtained showing polymerization took place both at room temperature and elevated temperature.

*Example 2*

An emulsion was prepared as in Example 1, which contained 67.5 g. of dimethylsiloxane cyclic tetramer, 139 milliliters of water and 18 g. of a 25% aqueous solution of lauryl hydrogen sulfate. After standing at room temperature for about 22 hours, the emulsion was neutralized with 10% aqueous sodium carbonate solution and then broken with acetone. A polymeric fluid having a viscosity of about 23,000 cs. was obtained.

*Example 3*

An emulsion was prepared as in Example 1 which contained 70.5 g. of dimethylsiloxane cyclic tetramer, 146 milliliters of water and 18.8 g. of a 25% aqueous solution of tridecyl hydrogen sulfate. After standing at room tempreature for about 49 hours the emulsion was neutralized with 10% aqueous sodium carbonate solution and then broken with acetone. A polymeric fluid was obtained which was then dried for about 30 minutes on a steam bath. The resulting polymeric fluid had a viscosity of greater than 30,000 cs.

*Example 4*

Four aqueous emulsions were prepared with a Manton-Gaulin laboratory homogenizer at 4000 p.s.i. The emulsions contained the following ingredients:

(A)

|  | G. |
|---|---|
| Dimethylsiloxane cyclic tetramer | 175 |
| Water | 315 |
| Lauryl hydrogen sulfate | 10 |

(B)

| Dimethylsiloxane cyclic tetramer | 175 |
|---|---|
| Water | 310 |
| Lauryl hydrogen sulfate | 10 |
| Sodium lauryl sulfate (emulsifier) | 5 |

(C)

| Dimethylsiloxane cyclic tetramer | 175 |
|---|---|
| Water | 315 |
| Tridecyl hydrogen sulfate | 10 |

(D)

| Dimethylsiloxane cyclic tetramer | 175 |
|---|---|
| Water | 295 |
| Tridecyl hydrogen sulfate | 10 |
| Aqueous sodium tridecyl sulfate solution (25% solids-emulsifier) | 20 |

The above emulsions were allowed to stand at room temperature after preparation. The extent and rate of polymerization was checked periodically by measuring the percent of the cyclic material still present and/or the viscosity of the polymeric fluid produced. The test results are set forth in the table below.

TABLE

| Emulsion | | Polymerization Time | | | | |
|---|---|---|---|---|---|---|
| | | 1 day | 3 days | 1 week | 2 weeks | 4 weeks |
| A | Percent cyclics | 20 | 17.1 | | 15.4 | |
| | Viscosity, cs | | | [1] 87,100 | 685,000 | 888,000 |
| B | Percent cyclics | 62.3 | 20. | | 18.3 | |
| | Viscosity, cs | | | [1] 65,900 | 504,000 | 680,000 |
| C | Percent cyclics | 25.1 | 19.8 | 19.4 | 17 | |
| | Viscosity, cs | | | [1] 85,400 | 568,000 | 800,000 |
| D | Percent cyclics | 90.2 | 21.8 | 21.6 | 18.3 | |
| | Viscosity, cs | | | 124,800 | 432,400 | 595,700 |

[1] Cps.

Example 5

When the catalysts below are substituted for those in the examples above in amounts of 0.5, 1, 3 or 5 percent by weight, similar results are obtained:
(1) Hexyl hydrogen sulfate,
(2) Octyl hydrogen sulfate,
(3) Decyl hydrogen sulfate,
(4) Octadecyl hydrogen sulfate,
(5) Oleyl hydrogen sulfate,
(6) Dodecenyl hydrogen sulfate,
(7) Decynyl hydrogen sulfate.

Example 6

When the procedure of Example 3 is followed, the siloxanes below polymerize in a similar manner.
(1) A mixture of dimethylsiloxane cyclics and hexamethyldisiloxane.
(2) A mixture of trimethylmethoxysilane and dimethylsiloxane cyclics.
(3) A mixture of dimethylsiloxane cyclics and methylvinylsiloxane cyclics.
(4) A mixture of dimethylsiloxane cyclics and a trimethylsilyl-endblocked polymethylhydrogensiloxane.
(5) A mixture of dimethylsiloxane cyclics and phenylmethylsiloxane cyclics.
(6) A mixture of dimethylsiloxane cyclics and 3,3,3-trifluoropropylmethylsiloxane cyclics.
(7) A hydroxyl-endblocked polydimethylsiloxane.
(8) Diphenylsilane diol.
(9) Para-bis(hydroxydimethylsilyl)benzene.
(10) Propyltrimethoxysilane.
(11) Dimethyldimethoxysilane.
(12)

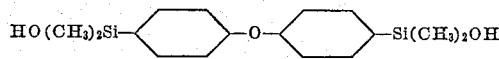

(13) $HO(CH_3)_2SiCH_2CH_2Si(CH_3)_2OH$.
(14) $(CH_3O)_2(CH_3)SiO[(CH_3)_2SiO]_{12}$
$Si(CH_3)(OCH_3)_2$.

That which is claimed is:
1. A method which comprises polymerizing and copolymerizing
(1) at least one member selected from the group consisting of organosiloxanes of the unit formula

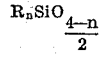

in which R is selected from the group consisting of hydrogen atoms, monovalent hydrocarbon radicals and monovalent halohydrocarbon radicals and $n$ has an average value of from 1 to less than 3 and silcarbanes having the general formula

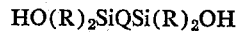

wherein R is selected from the group consisting of hydrogen atoms, monovalent hydrocarbon radicals and monovalent halohydrocarbon radicals and Q is a divalent radical attached to both silicon atoms via a silicon-carbon bond, said Q being selected from the group consisting of radicals composed of carbon and hydrogen atoms and radicals composed of carbon, hydrogen and oxygen atoms, there being less than 15 carbon atoms in said Q radical and any oxygen that is present being in the form of ether linkages, by polymerizing said member, in an aqueous medium while in a dispersed state, in the presence of
(2) a compound of the formula $R'OSO_2OH$ wherein R' is a monovalent aliphatic hydrocarbon radical of at least 6 carbon atoms, as the primary catalyst for polymerization, until the desired increase in molecular aggregation is obtained.

2. The method of claim 1 wherein the member (1) is an ornagosiolxane.
3. The method of claim 2 wherein R' contains from 10 to 18 carbon atoms.
4. The method of claim 2 wherein $n$ averages from 1.9 to 2.1 inclusive.
5. The method of claim 1 wherein the number (1) is a silcarbane.
6. The method of claim 5 wherein R' contains from 10 to 18 carbon atoms.
7. The method of claim 1 wherein the member (1) is a mixture of an organosiloxane and a silcarbane.
8. The method of claim 7 wherein R' contains from 10 to 18 carbon atoms.
9. The method of claim 7 wherein $n$ averages from 1.9 to 2.1 inclusive.
10. A method of preparing emulsions of organosiloxanes which comprises polymerizing and copolymerizing
(1) at least one member selected from the group consisting of organosiloxanes of the unit formula

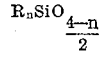

wherein R is selected from the group consisting of hydrogen atoms, monovalent hydrocarbon radicals and monovalent halohydrocarbon radicals and $n$ has an average value of from 1 to less than 3 and silcarbanes having the general formula

wherein R is selected from the group consisting of hydrogen atoms, monovalent hydrocarbon radicals and monovalent halohydrocarbon radicals and Q is a divalent radical attached to both silicon atoms via a silicon-carbon bond, said Q being selected from the group consisting of radicals composed of carbon and hydrogen atoms and radicals composed of carbon, hydrogen and oxygen atoms, there being less than 15 carbon atoms in said Q radical and any oxygen that is present being in the form of ether linkages, by polymerizing said member, in an aqueous medium while in a dispersed state, in the presence of
(2) a compound of the formula $R'OSO_2OH$ wherein R' is a monovalent aliphatic hydrocarbon radical of at least 6 carbon atoms, as the primary catalyst for polymerization, until the desired increase in molecular aggregation is obtained, and thereafter neutralizing compound (2).

11. The method of claim 10 wherein the member (1) is an organosiloxane.

12. The method of claim 11 wherein R' contains from 10 to 18 carbon atoms.

13. The method of claim 11 wherein $n$ has a value of from 1.9 to 2.1 inclusive.

14. The method of claim 10 wherein the member (1) is a silcarbane.

15. The method of claim 14 wherein R' contains from 10 to 18 carbon atoms.

16. The method of claim 10 wherein the member (1) is a mixture of an organosiloxane and a silcarbane.

17. The method of claim 16 wherein R' contains from 10 to 18 carbon atoms.

18. The method of claim 16 wherein $n$ averages from 1.9 to 2.1 inclusive.

19. A method which comprises polymerizing (1) an organosiloxane essentially of the average formula

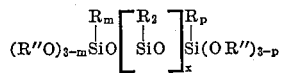

wherein each R is selected from the group consisting of hydrogen atoms, monovalent hydrocarbon radicals, and monovalent halohydrocarbon radicals, R'' is a lower alkyl radical, $m$ and $p$ are each integers of from 0 to 3 inclusive, the sum of $m$ and $p$ being not greater than 5, and $x$ has an average value of at least 7, while said siloxane is emulsified in an aqueous medium, in the presence of (2) a compound of the formula $R'OSO_2OH$ wherein R' is a monovalent aliphatic hydrocarbon radical of at least 6 carbon atoms, as the primary catalyst for the polymerization, until the desired increase in molecular aggregation of the siloxane is obtained.

20. The method of claim 19 wherein R' contains from 10 to 18 carbon atoms.

21. The method of claim 20 wherein the polymerized emulsion is neutralized and there is added thereto a filter.

22. The method of claim 21 wherein the filler is a silica filler.

23. A method which comprises polymerizing and copolymerizing (1) at least one member selected from the group consisting of organosiloxanes of the unit formula

in which R is selected from the group consisting of hydrogen atoms, monovalent hydrocarbon radicals and monovalent halohydrocarbon radicals and $n$ has an average value of from 1 to less than 3 and silcarbanes having the general formula

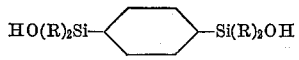

wherein R is selected from the group consisting of hydrogen atoms, monovalent hydrocarbon radicals and monovalent halohydrocarbon radicals, by polymerizing said member, in an aqueous medium while in a dispersed state, in the presence of (2) a compound of the formula $R'OSO_2OH$, wherein R' is a monovalent aliphatic hydrocarbon radical of at least 6 carbon atoms, as the primary catalyst for the polymerization, until the desired increase in molecular aggregation is obtained.

24. The method of claim 23 wherein R' contains from 10 to 18 carbon atoms.

25. The method of claim 23 wherein $n$ averages from 1.9 to 2.1 inclusive.

26. The method of claim 23 wherein the member (1) is a silcarbane.

27. The method of claim 26 wherein R' contains from 10 to 18 carbon atoms.

28. The method of claim 26 wherein the catalyst is neutralized and a filler is added after the desired increase in molecular aggregation is obtained.

29. A method which comprises polymerizing

in an aqueous medium, in the presence of a catalyst of the formula $R'OSO_2OH$, wherein R' is a monovalent aliphatic hydrocarbon radical of at least 6 carbon atoms.

30. The method of claim 29 wherein R' contains from 10 to 18 carbon atoms.

31. The method of claim 29 wherein the catalyst is neutralized after the desired increase in molecular aggregation is obtained.

32. The method of claim 29 wherein the catalyst is neutralized and a filler is added after the desired increase in molecular aggregation is obtained.

33. A method which comprises copolymerizing

and organosiloxanes of the unit formula

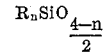

in which R is selected from the group consisting of hydrogen atoms, monovalent hydrocarbon radicals and monovalent halohydrocarbon radicals and $n$ has an average value of from 1 to less than 3, in an aqueous medium, in the presence of a catalyst of the formula $R'OSO_2OH$ wherein R' is a monovalent aliphatic hydrocarbon radical of at least 6 carbon atoms.

34. The method of claim 33 wherein R' contains from 10 to 18 carbon atoms.

35. The method of claim 33 wherein the catalyst is neutralized after the desired increase in molecular aggregation is obtained.

36. The method of claim 33 wherein the catalyst is neutralized and a filler is added after the desired increase in molecular aggregation is obtained.

37. The method of claim 36 wherein the filler is a silica filler.

References Cited

UNITED STATES PATENTS

| | | | |
|---|---|---|---|
| 2,562,000 | 7/1951 | Sveda | 260—46.5 |
| 2,891,920 | 6/1959 | Hyde et al. | 260—29.2 |
| 3,133,949 | 5/1964 | Rutkowski et al. | 260—448.2 |
| 3,175,993 | 3/1965 | Weyenberg | 260—46.5 |
| 3,294,725 | 12/1966 | Findlay et al. | 260—29.2 |

OTHER REFERENCES

"Surface Active Agents," vol. I, Schwartz et al., Interscience Publishers, New York, 1949, TP14953, p. 53–58.

MURRAY TILLMAN, *Primary Examiner.*

J. C. BLEUTGE, *Assistant Examiner.*